United States Patent [19]
Ohms et al.

[11] Patent Number: 5,559,684
[45] Date of Patent: *Sep. 24, 1996

[54] SWITCHING REGULATOR

[75] Inventors: Franz Ohms, Oberrot; Heike Rupright, Booknang, both of Germany

[73] Assignee: Ant Nachrinctentechnik GmbH, Backnang, Germany

[21] Appl. No.: 167,820

[22] PCT Filed: May 23, 1992

[86] PCT No.: PCT/DE92/00416

§ 371 Date: Dec. 17, 1993

§ 102(e) Date: Dec. 17, 1993

[87] PCT Pub. No.: WO92/22955

PCT Pub. Date: Dec. 23, 1992

[ * ] Notice: The term of this patent shall not extend beyond the expiration date of Pat. No. 5,438,500

[30] Foreign Application Priority Data

Jun. 19, 1991 [DE] Germany .......... 41 20 147.7
Jul. 17, 1991 [DE] Germany .......... 41 23 634.3

[51] Int. Cl.⁶ .................................. H02M 3/337
[52] U.S. Cl. .............. 363/25; 363/101; 363/134
[58] Field of Search ............... 363/22, 23, 24, 363/25, 26, 97, 101, 134; 323/259, 344

[56] References Cited

U.S. PATENT DOCUMENTS

| | | | |
|---|---|---|---|
| 4,443,840 | 4/1984 | Geissler et al. | 363/24 |
| 4,937,725 | 6/1990 | Dhyanchand et al. | 363/56 |
| 4,980,813 | 12/1990 | Wells | 363/124 |
| 5,001,413 | 3/1991 | Ohms | 323/285 |
| 5,353,212 | 10/1994 | Loftus, Jr. | 363/17 |
| 5,438,500 | 8/1995 | Ohms | 363/24 |

FOREIGN PATENT DOCUMENTS

| | | |
|---|---|---|
| 2501527 | 7/1976 | Germany . |
| 2941009A1 | 4/1981 | Germany . |
| 3812861A1 | 10/1989 | Germany . |
| 1172501 | 12/1969 | United Kingdom . |

*Primary Examiner*—Peter S. Wong
*Assistant Examiner*—Adolf Berhane
*Attorney, Agent, or Firm*—Loeb & Loeb LLP

[57] ABSTRACT

A switching regulator composed of a push-pull converter with a buck or boost regulator connected upstream. The output inductance of the regulator is split into two separate inductances each of which is fed to one leg of the push-pull circuit. The push-pull converter is expanded to a resonance converter by means of resonance capacitors. This switching regulator has a high efficiency and is particularly suitable for use in satellite power supplies.

12 Claims, 4 Drawing Sheets

5,559,684

SWITCHING REGULATOR

BACKGROUND OF THE INVENTION

The invention relates to a switching regulator, comprising a push-pull converter with a series-connected buck or boost regulator. A switching regulator of this kind with a series-connected buck regulator is known from Watkins Johnson Co., Palo Alto, USA, Tech-Notes "Design of Power Converters for Space TWTA's", pages 1 to 13, or from German Patent Publication DE 29 41 009 C2.

Switching regulators of this type are employed when greatly varying input voltages must be processed, such as in satellite power supplies. As a rule, the buck regulator is pulse-width modulated as a function of the output voltage of the switching regulator. The downstream-connected push-pull converter is operated either with push-pull pulses of constant lengths or also with pulse-width modulated pulses.

A switching regulator in the form of a boost or buck regulator having an auto-transformer and with a downstream-connected push-pull regulator is known from British Patent GB-PS 1,172,501.

It is known from German Patent Publication DE 29 41 009 C2 to series-connect a series switching regulator in the form of a boost/or buck regulator to a conventional push-pull regulator, in particular for the purpose of processing greatly varying input voltages, for example with satellite power supplies. There, too, the series switching regulator is pulse-width modulated as a function of the output voltage of the switching regulator.

SUMMARY OF THE INVENTION

It is the object of the invention to embody the switching regulator of the previously mentioned type in such a way that a high degree of efficiency can be achieved. This object is attained by the characteristics of claim 1. The dependent claims disclose advantageous embodiments of the invention. Although it is known from U.S. Pat. No. 4,959,765 or from the Siemens Journal 48 (1974), Issue 11, pages 840 to 846, to complement a push-pull regulator to form a resonance converter by connecting a resonance capacitor in order to improve the efficiency of a push-pull regulator, the resonance converters therein disclosed are not easily suited for operation with a series-connected buck regulator or boost regulator. To reduce switching losses in the push-pull regulator known from EP 77 958 B1, the push-pull regulators are operated with a blackout time of such a duration that during this time the push-pull regulator as a resonance structure can automatically reverse by means of its inherent resonance excitation.

The switching regulator in accordance with the invention has the advantage that it is possible to select the capacity of the corresponding resonance converter to be higher than in conventional resonance or quasi-resonance converters. Sufficient time is available for recharging a resonance capacitor, namely in each case the time while the respective push-pull switch is open and the blackout time. It is possible to operate the resonance converter with a boost or buck regulator meaningfully as a pre-regulator only on the basis of this realization. The transformer of the push-pull converter is better utilized than with other comparable resonance converters, i.e. with the same output it is possible to reduce the structural size, which is of particular advantage in the employment in satellites. The regulation of the buck regulator or the boost regulator is very dependable, because the regulating criteria are derived from separate branches of the push-pull converter. Interference signals (ripples) are greatly suppressed by adding the voltages at the resonance capacitors for regulating the buck regulator in accordance with claim 6.

BRIEF DESCRIPTION OF THE DRAWING

An exemplary embodiment of the invention will be described in greater detail by means of the drawings. Shown are in FIG. 1 a principal circuit diagram of a switching regulator in accordance with the invention, FIGS. 2A, 2B and 2C courses over time of selected signals for the switching regulator in accordance with FIG. 1, FIG. 3 a replacement circuit diagram of the push-pull converter for one of the push-pull branches, FIG. 4 the reversing current of the push-pull converter for different sizes of structural elements, FIG. 5 a principal circuit diagram of a modified switching regulator of the invention.

DESCRIPTION OF THE PREFERRED EMBODIMENTS

Figure 1:
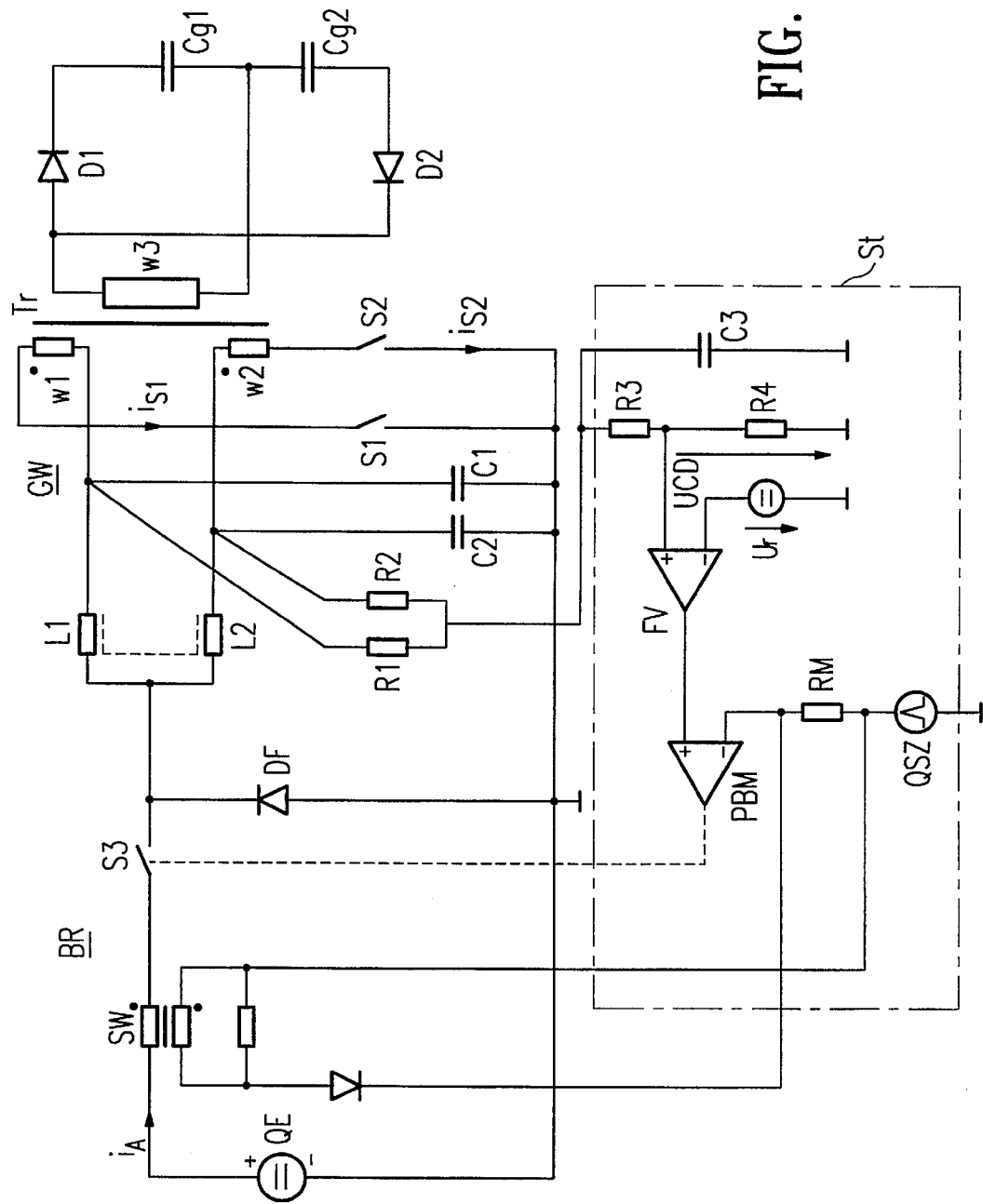

A buck regulator BR, supplied by an input dc-voltage source QE is shown in FIG. 1, downstream of which a parallel push-pull dc-voltage converter GW is connected. The buck regulator BR comprises an actuator in the series branch, symbolized here by the switch S3, and a recovery diode DF. In accordance with the invention, the output inductance of the buck regulator in the series branch is divided into two individual inductances L1 and L2, which can be magnetically separated from each other or loosely coupled. The push-pull converter GW comprises a power transformer Tr with two primary windings w1 and w2, which are galvanically separated from each other, and a secondary winding w3.

The individual inductances L1 and L2 are respectively connected to one of the push-pull branches of the push-pull converter. Two rectifier circuits with diodes D1, D2 and smoothing capacitors Cg1 and Cg2 are shown in the output circuit of the push-pull converter GW. The two push-pull switches S1 and S2 of the push-pull converter are respectively disposed in series in relation to one of the primary windings w1 or w2, which in turn are respectively disposed in series in relation to one of the individual inductances L1, L2. The winding direction of the primary windings w1 and w2 is marked by dots in FIG. 1. In contrast to customary solutions, two resonance capacitors C1 and C2 are provided for embodying the push-pull converter as a resonance converter. These resonance capacitors C1, C2 are connected to the connecting line between an individual inductance L1; L2 and a primary winding w1; w2 on the one side, and to the connecting point, remote from the primary winding, of the two push-pull switches S1 and S2. In this way the resonance capacitors C1 and C2 are respectively located parallel to the series connection of a push-pull switch and a primary winding. The resonance capacitors can also be disposed at other locations in the push-pull branches, for example in series with the primary windings and/or in at least one of the output circuits. The individual inductances L1 and L2 do not determine the resonance frequency of the push-pull converter GW embodied as a resonance converter. The resonance capacitors C1 and C2 are uncoupled from each other by the inductances L1 and L2, so that no mistuning of the resonance frequency can result.

Figure 2A:
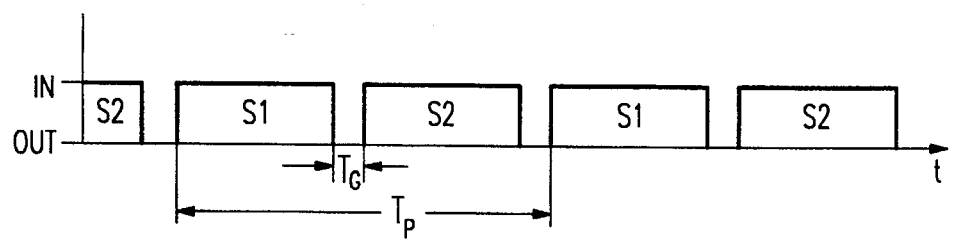
Figure 2B:
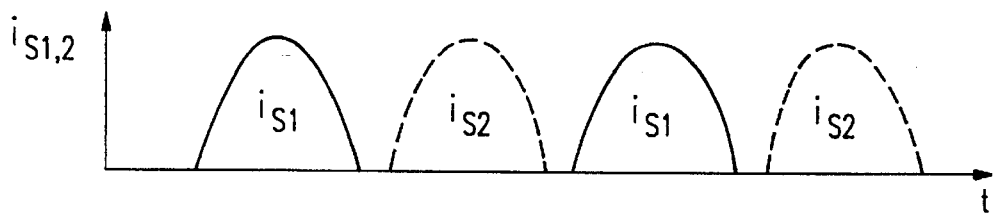
Figure 2C:
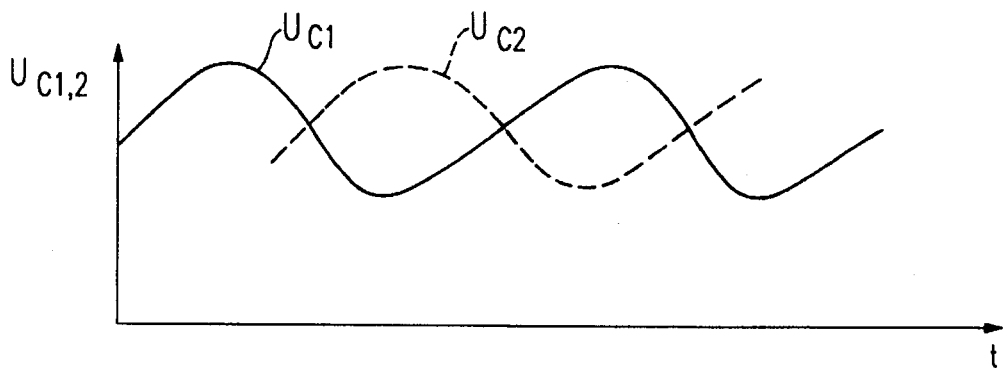
Figure 3:
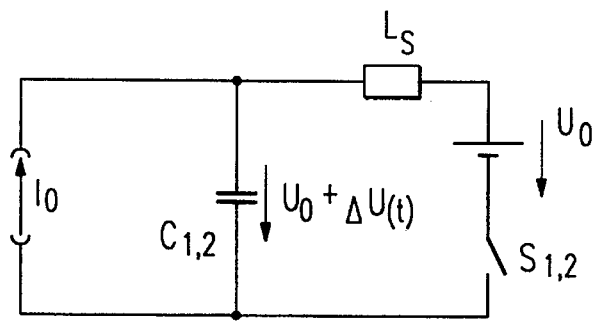

The switching interplay of the push-pull switches S1 and S2 are shown in the first line of FIGS. 2A, 2B and 2C. The switches S1 and S2 are alternatingly switched on during the length of a period $T_P$. Both switches are currentless during a blackout time $T_G$. This blackout time $T_G$ is preferably selected such that during this time the resonance structure in the form of the push-pull converter can reverse, if required with the inclusion of parasitic winding capacitors or rectifier capacitors. A control device in accordance with EP 77 958 B1 can be used for the preparation of the control signals for the switches S1 and S2, taking into consideration the blackout time $T_G$. The currents $i_{s1}$ and $i_{s2}$ in the push-pull branches on the primary side are shown in FIGS. 2A, 2B and 2C, line 2 ($i_{s2}$ is dashed). FIGS. 2A, 2B and 2C, line 3 shows the voltages $U_{c1}$ and $U_{c2}$ at the resonance capacitors C1, C2. FIG. 3 shows the replacement circuit diagram for a push-pull branch. The input current $I_o$ of the push-pull converter is represented by a current source. The transformer Tr is represented by its leakage inductance $L_S$. The voltage $U_o$ represents the output voltage transformed from the secondary circuit. The voltage $U_o + \Delta u_{(t)}$ is then applied at the resonance capacitor C1 or C2. The following equation applies to the current $I_{L(t)}$ in the resonance circuit:

$$i_{L(t)} = I_o (1 - \cos\omega t) + \frac{\Delta U}{\sqrt{L_s/C1,2}} \sin\omega t$$

with $\omega \approx \dfrac{1}{\sqrt{L_s \cdot C1,2}}$ .

with $\Delta U = \dfrac{I_o}{2\, C1,2} (T_P/2 * T_G)$ the following applies:

$$i_{L(t)} = I_o \left[ 1 - \cos\omega t + \left( \frac{T_p}{4} + \frac{T_G}{2} \right) \frac{1}{\sqrt{L_s \cdot C1,2}} \sin\omega t \right].$$

Figure 4:
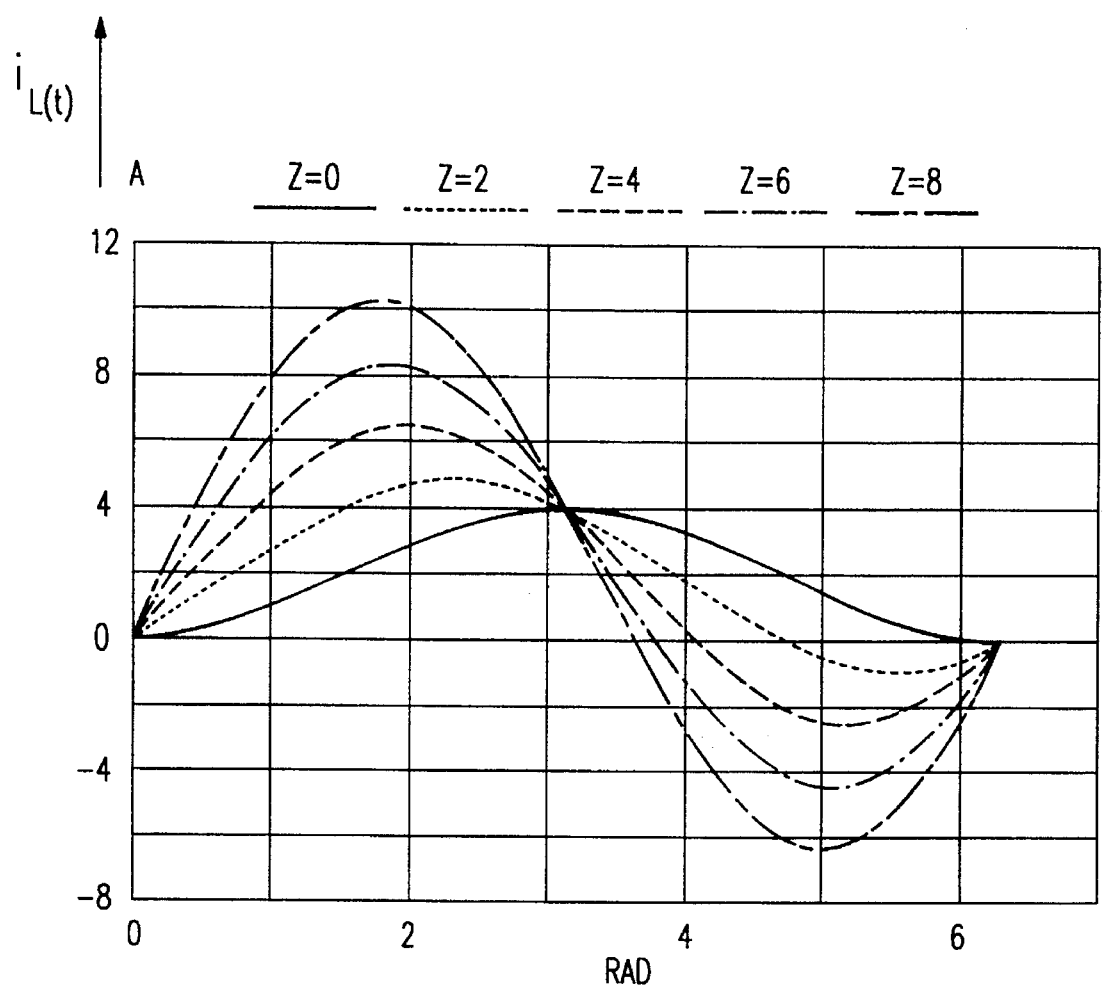

For different values of $$Z = \frac{\Delta U}{\sqrt{L_s/C1,2}}$$

the reversing current $i_{L(t)}$ is shown in FIG. 4. The higher the value Z is selected, the higher the resonance rise. It is advantageous to select the value Z as high as possible in order to obtain a steep crossover of the current and to obtain assured switching in this way.

A control circuit St containing a pulse width modulator PBM is provided for generating a control signal for the buck regulator BR. The voltages at the resonance capacitor C1 and C2 as well as the energy absorption current $i_A$ of the buck generator BR are utilized as control criteria for the pulse width modulator PBM. The energy absorption current $i_A$ is captured via the current transformer SW, is rectified and supplied to a resistor RM, which is series-connected together with a sawtooth voltage source QSZ to the inverting input of the pulse width modulator PBM, which is embodied as a comparator. The non-inverting input of the pulse width modulator PBM is connected with the output of an error signal amplifier FV, which compares the other switching criteria—in this case the voltages at the resonance capacitors C1, C2—with a reference voltage Ur. The mode of operation of this control circuit St can be found in U.S. Pat. No. 5,001,413. Thus, the length of the control pulse for the switching regulator actuator S3 depends on the strength of the energy absorption current $i_A$ and the strength of the error signal at the output of the error signal amplifier FV. A summator net, consisting of the resistors R1, R2, R3, R4, C3, is provided to obtain the resonance capacitor-dependent control criteria, by means of which a voltage UCD is obtained which is proportional to the sum of the added voltages at the resonance capacitors C1 and C2. The capacitor C3, in parallel to the potentiometer R3, R4, is used to integrate the added voltages.

If required, it is also possible to series-connect a boost regulator to the push-pull converter in place of a buck regulator. In this case the switching times and the circuit design must be changed in accordance with the known properties of a boost regulator. If a boost regulator to be used does not already have an inductance on the output side anyway, it must also be changed in such a way that it has an inductance on the output side which can then be divided, as previously described.

Figure 5:
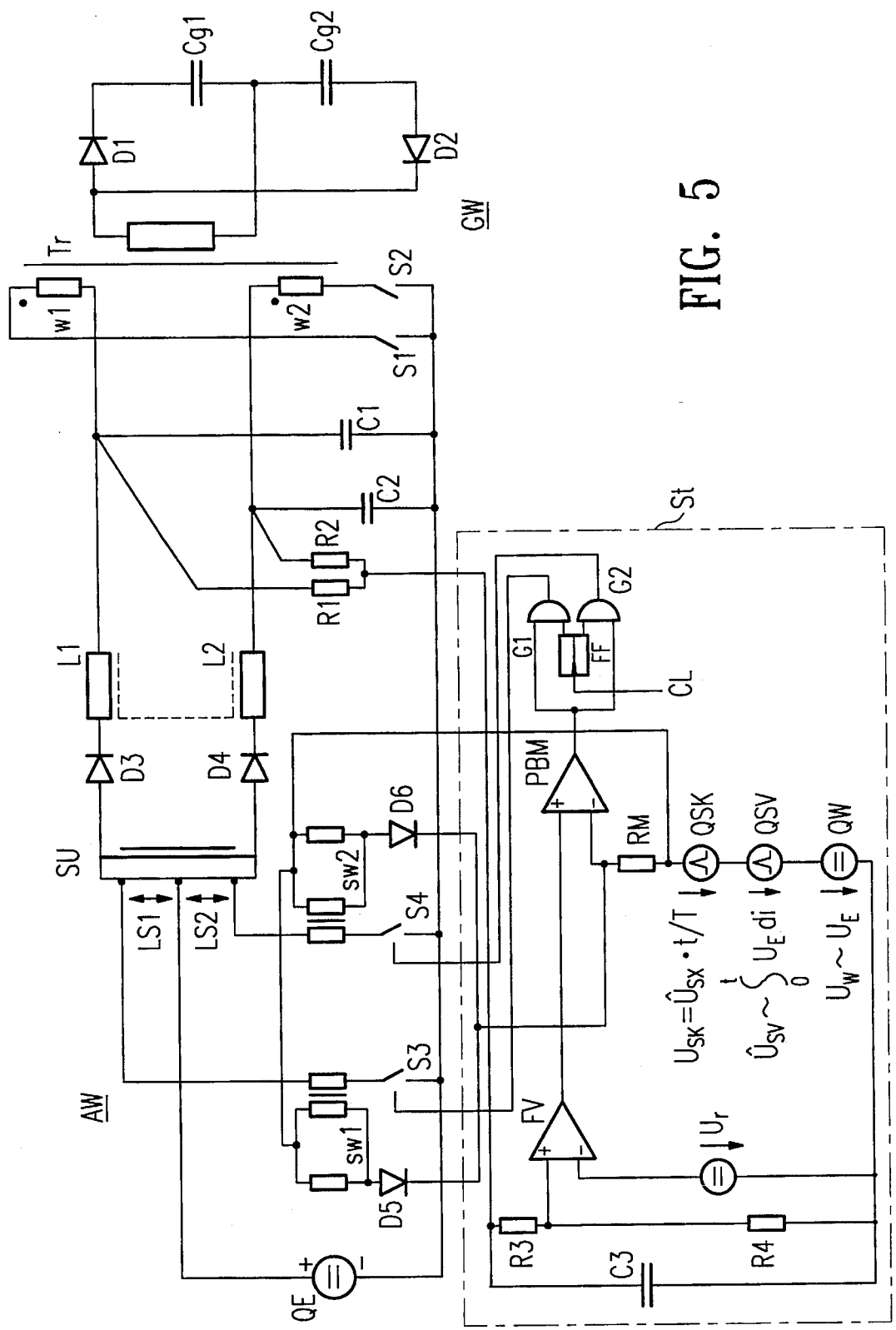

It is particularly advantageous to use a boost regulator such as shown in FIG. 5. The boost regulator consists of an auto-transformer SU, two actuators, represented here by the switches S3 and S4, rectifiers D3, D4 and the inductances L1 and L2. In the exemplary embodiment illustrated, the winding center of the auto-transformer SU is connected with the positive pole of the input dc-voltage source QE. One of the switches S3 or S4 respectively is disposed between taps, disposed symmetrically to the winding center, of the auto-transformer SU and the negative pole. In this way the switches S3 and S4 are connected via respectively a partial inductance LS1 and LS2 of the auto-transformer SU with the input dc-voltage source. The rectifiers D3 and D4, which are polarized in the same direction and are respectively connected with the winding ends of the auto-transformer SU, constitute the secondary circuit of the boost regulator. In contrast to boost regulators used up to this time (see GB Patent 1,172,501 or U.S. Pat. No. 5,001,413), the output inductance of the boost regulator is divided in accordance with the invention into the two individual inductances L1 and L2, which are respectively series-connected with the rectifiers D3 and D4. As in the exemplary embodiment of FIG. 1, these individual inductances L1 and L2 can be magnetically separated from each other or loosely coupled.

The push-pull converter GW is structured as in FIG. 1 and comprises a power transformer Tr with two primary windings w1 and w2, galvanically separated from each other, and a secondary winding w3. Respectively one of the series circuits, consisting of rectifiers D3 and D4 and individual inductances L1 or L2, is connected with a push-pull branch of the push-pull converter GW, namely in that the primary winding w1 or w2 of a push-pull branch is series-connected with the series circuits D3, L1 or D4, L2. Together, the resonance capacitors C1, C2 of the push-pull converter simultaneously constitute the output capacitances of the boost regulator outputs. In respect to the push-pull branches, they are located respectively parallel with the series circuit formed from the primary windings w1 or w2 and push-pull switches S1 or S2. In an alternate embodiment, the resonance capacitors can also be disposed at another location in the push-pull branches and/or in at least one of the output circuits. A common control circuit St is provided for generating the control signal for the boost regulator, by means of which the actuators S3 and S4 can be alternatingly switched on. The control circuit St contains a pulse width modulator PBM. The voltages at the resonance capacitors C1 and C2 are utilized as the control criteria for the pulse width modulator PBM, as well as the energy absorption current $i_A$ of the switching regulator flowing between the input dc-voltage source and the center tap of the auto-transformer SU. Alternatively to this it is possible, as shown in FIG. 1, to detect the currents respectively flowing over the actuators S3 and S4 by means of respectively one current transformer SW1 and SW2 and to rectify them by means of the two rectifiers D5, D6. The outputs of the two rectifiers D5, D6 are connected and brought to a common resistor RM, which is connected to the inverting input of the pulse width modulator PM embodied as a comparator. The separate detection of the current via the actuators has the advantage that asymmetries in the switching times of the two switches S3 and S4 cannot result in errors. Three signal sources are located in series with the resistor RM: a sawtooth voltage source QSK generating a sawtooth-shaped signal $U_{SK}$ of constant maximum amplitude, a further sawtooth voltage source $Q_{SV}$, the maximum amplitude $U_{SV}$ of which is selected to be proportional to the integrated voltage UE of the input dc-voltage source QE, and a dc source QW, the voltage $U_W$ of which is selected to be proportional to the strength of the input dc voltage UE. The non-inverting input of the pulse width modulator PBM is connected with the output of an error signal amplifier FV which compares the other switching criteria—in this case the voltages at the resonance capacitors C1, C2—with a reference voltage Ur. It is assured by this circuitry that the arithmetic mean value of the output current of the boost regulator is constant and a stable regulator operation is possible. Details regarding the dimensioning of this circuitry can be found in U.S. Pat. No. 5,001,413 or DE 38 28 818 A1 (FIGS. 2A, 2B and 2C and specification); as can the mode of operation of the control circuit St. Thus, the length of the control pulse for the switching regulator actuators S3 and S4 depends on the strength of the energy absorption current $i_A$ or of the currents across the individual actuators S3, S4 and the strength of the error signal at the output of the error signal amplifier FV. As in the exemplary embodiment of FIG. 1, a summator net, consisting of the resistors R1, R2, R3, R4, C3, is provided to obtain the resonance capacitor-dependent control criteria, by means of which a voltage UCD is obtained which is proportional to the sum of the added voltages at the resonance capacitors C1 and C2. The capacitor C3, in parallel to the potentiometer R3, R4, is used to integrate the added voltages.

To obtain the push-pull pulses for the switches S3 and S4, it is possible to employ a conventional pulse divider stage at the output of the pulse width modulator PBM, which can be composed of two AND-gates G1 and G2 and a push-pull flip-flop FF, as in U.S. Pat. No. 5,001 413, for example.

Up to now, a boost regulator (boost) with an auto-converter was treated as a series stage for the push-pull converter. By changing the tap locations for the connecting lines to the switches S3 and S4, relocating the connections of the rectifiers D3 and D4 at the auto-transformer (tap locations) and/or changing the trigger signals for the switches S3 and S4, it is also possible to realize a buck regulator (buck) as the series stage for the push-pull converter. Suggestions for such employment can be found in DE 29 41 009 C2 or in DE 36 28 138 A1.

We claim:

1. A switching regulator, comprising a push-pull converter (GW), which is embodied as a resonance converter, with a series-connected buck or boost regulator, wherein the primary windings (W1, W2) of the push-pull converter transformer (Tr) are galvanically separated from each other, characterized in that the output inductance of the buck or boost regulator (BR) is divided into two individual inductances (L1, L2), wherein these individual inductances (L1, L2) are respectively supplied to one of the push-pull branches of the push-pull converter (GW), and that each of the push-pull branch of the push-pull converter has at least one resonance capacitor (C1; C2), which is respectively connected to the series connection of one individual inductances (L1, L2) with a primary winding of the push-pull converter transformer (Tr).

2. A switching generator in accordance with claim 1, characterized in that the individual inductances (L1, L2) are magnetically weakly coupled.

3. A switching generator in accordance with claim 1, characterized in that the resonance capacitors (C1, C2) of the push-pull branches are connected to the connecting line between an individual inductance (L1; L2) and a primary winding (11; w2) on the one side, and to the connecting point remote from the primary winding of the two push-pull switches (S1, S2).

4. A switching generator in accordance with claim 1, characterized in that at least one of the voltages at the resonance capacitors (Cl, C2) can be supplied as control criteria to the control circuit (St) for the buck/boost generator (BR).

5. A switching generator in accordance with claim 4, characterized by a summator net (R1, R2, R3, R4, C3) for the two voltages at the resonance capacitors which is connected, if required with the interposition of an error signal amplifier (FV), to a control input of the pulse width modulator (PBM) for the buck generator (BR).

6. A switching generator in accordance with claim 5, characterized in that the absorbed current ($i_A$) of the switching regulator or a signal derived therefrom, on which a sawtooth signal has been superimposed if required, can be supplied as further control criteria to the control circuit (St) for the buck/boost regulator (BR).

7. A switching generator in accordance with claim 1, characterized in that the push-pull switches (S1, S2) can be operated with a blackout time during which both switches (S1, S2) are currentless at the same time, and that this blackout time ($T_G$) is of such a duration that, on the one hand, the push-pull converter (GW) as a resonance structure can assuredly reverse and, on the other hand, there is sufficient time available for recharging the respective resonance capacitor (C1; C2).

8. A switching generator in accordance with claim 5, characterized in that the boost/or buck generator (AW) consists of an auto-transformer (SU) and switches (S3, S4) on the primary side, which are respectively connected with an input dc- voltage source (QE) via respectively one partial inductance (LS1, LS2) of the auto-transformer (SU), and of rectifiers (D1, D2) on the secondary side and an output inductance which is divided into the two individual inductances (L1, L2).

9. A switching generator in accordance with claim 8, characterized in that the currents respectively flowing across the switches (S3, S4) on the primary side or a signal derived therefrom, on which a sawtooth signal is superimposed, if required, can be provided as further control criteria to the control circuit (St) for the boost/or buck regulator (AW).

10. A switching generator in accordance with claim 9, characterized in that the signal derived from the added voltage at the resonance capacitors (C1, C2) is supplied to the pulse width modulator (PBM) on the one side and a reference signal on the other side, which is composed of a signal proportional to the absorbed current ($i_A$), a sawtooth-shaped signal ($U_{SK}$) of a constant maximum amplitude and at least one further signal ($U_{SV}$, $U_W$), the amplitude of which depends on the strength of the input voltage (UE) of the switching generator.

11. A switching generator in accordance with claim 10, characterized in that the further signal is a sawtooth-shaped signal ($U_{SV}$), the maximum amplitude of which is proportional to the integrated input voltage (UE).

12. A switching generator in accordance with claim 8, characterized in that the push-pull switches (S1, S2) can be operated with a blackout time during which both switches (S1, S2) are currentless at the same time and that this blackout time ($T_G$) is of such a duration that, on the one hand, the push-pull converter (GW) as a resonance structure can assuredly reverse and, on the other hand, there is sufficient time available for recharging the respective resonance capacitor (C1; C2).

\* \* \* \* \*